Oct. 2, 1962     H. W. HOADLEY     3,056,391
ROTARY INTERNAL COMBUSTION ENGINE
Filed July 7, 1960     2 Sheets-Sheet 1
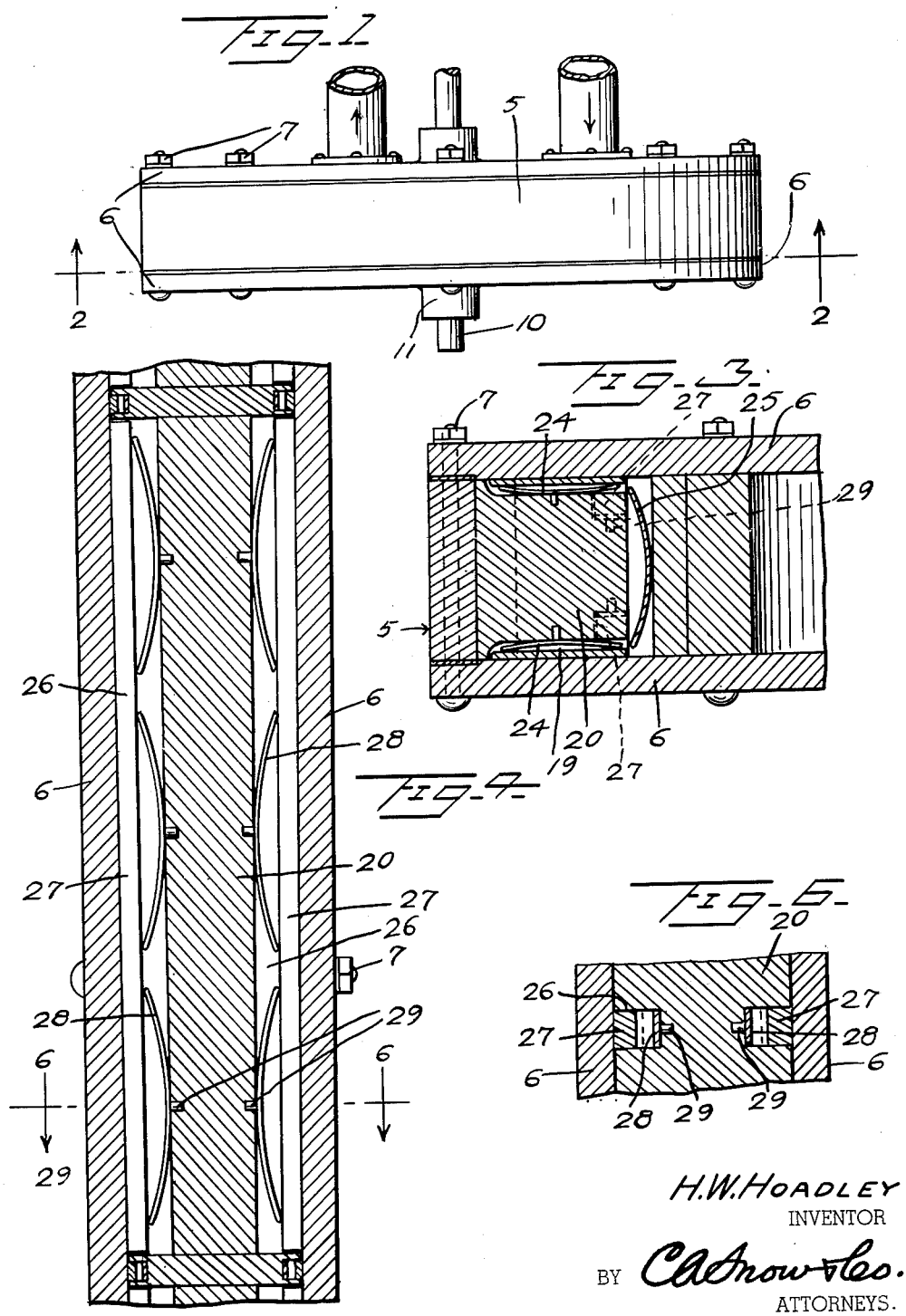
H. W. HOADLEY
INVENTOR
BY *C. A. Snow & Co.*
ATTORNEYS.

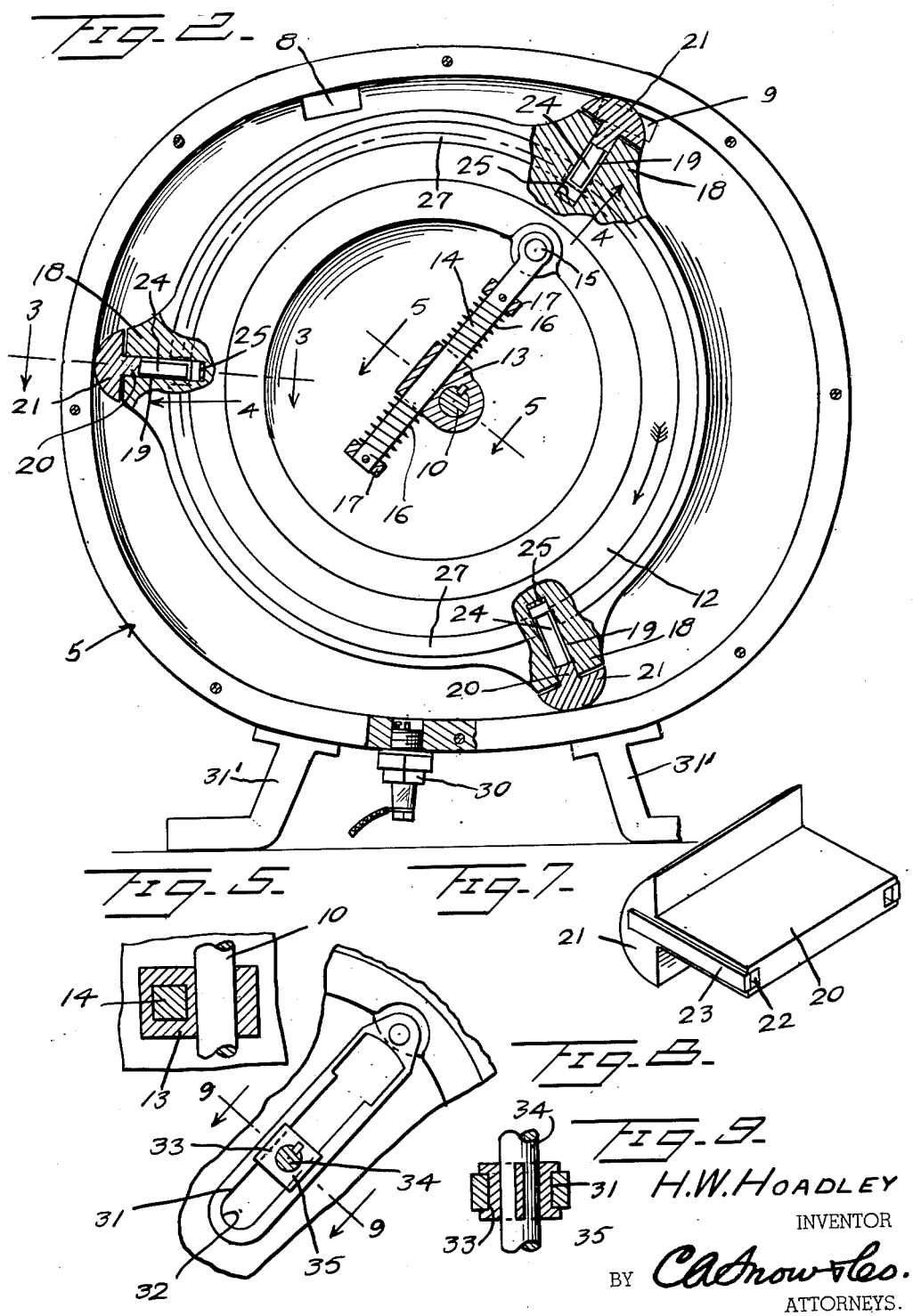

3,056,391
ROTARY INTERNAL COMBUSTION ENGINE
Harry W. Hoadley, 139 Laquineo St., Findlay, Ohio
Filed July 7, 1960, Ser. No. 41,431
4 Claims. (Cl. 123—16)

This invention relates to rotary engine construction, and more particularly to rotary engines of an internal combustion type.

An important object of the invention is to provide a rotary engine wherein the shape of the rotor casing is such that the periphery of the rotor will cooperate with the wall of the rotor casing, providing combustion chambers with the necessary abutments against which the impelling force of the fuel charge is directed, rotating the rotor and shaft on which the rotor is mounted.

Another important object of the invention is to provide a rotor which is so constructed and arranged that during the cycle of rotation, the rotor will operate to draw a charge of fuel into the rotor housing or casing, compressing the charge at a point where the charge is fired, impelling the rotor and shaft of the engine.

A further object of the invention is to provide a rotor which will, after the firing of the fuel charge, act as a means for clearing the space between the rotor and wall of the rotor housing, of the exhaust gases, preparatory to the delivery of a fuel charge to the engine housing, to be compressed and fired.

A still further object of the invention is to provide a substantially oval engine casing and a concentric circular rotor operating in said casing, and a shaft on which said rotor is mounted for operation, together with a yieldable connecting mechanism between said engine shaft and rotor by means of which sliding movement of said shaft will be permitted at all times, and to insure sealing of the rotor with respect to the wall of the casing.

Another important object of the invention is to provide means for sealing the contact points between the rotor and casing, insuring against loss of compression during the operation of the rotor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

FIGURE 1 is a plan view of a rotary internal combustion engine, constructed in accordance with the invention.

FIG. 2 is an elevational view with the cover plate of the casing removed, and illustrating portions of the rotor in section.

FIG. 3 is a sectional view taken on line 3—3 of FIG. 2.

FIG. 4 is a sectional view taken on line 4—4 of FIG. 2.

FIG. 5 is a sectional view taken on line 5—5 of FIG. 2.

FIG. 6 is a sectional view taken on line 6—6 of FIG. 4.

FIG. 7 is a perspective view of one of the adjustable rotor contact tips.

FIG. 8 is a fragmentary elevational view of a modified form of connecting means between the shaft and rotor of the engine.

FIG. 9 is a sectional view taken on line 9—9 of FIG. 8.

Referring to the drawings in detail, the engine embodies a casing 5 which is substantially oval in formation as better shown by FIG. 2 of the drawings.

The sides of the casing are closed by means of the closure plates 6 which are bolted to the central portion of the casing, as by means of the bolts 7. The casing is formed with an exhaust port 8 and an inlet port 9, the inlet port being connected with a suitable supercharger, or carburetor not shown.

The reference character 10 indicates the engine shaft which operates in bearings 11 formed in the closure plates 6, and on which the rotor 12 is keyed, as better shown by FIG. 2 of the drawings, the rotor 12 being provided with a bearing 13 formed with an opening through which the shaft 14 operates, the shaft 14 moving slidably through the bearing 13. This shaft 14 has pivotal connection with the rotor 12, at 15, allowing floating movement of the rotor within the housing to permit the rotor to follow the contour of the inner surface of the casing 5.

Stabilizing springs 16 are mounted on the shaft 14 and have one of their respective ends contacting the bearing 13, and the opposite ends of the springs are held in their adjusted positions along the shaft 14, by means of the adjustable collars 17.

The rotor which is substantially cylindrical in shape, is formed with enlargements 18, which enlargements extend transversely of the rotor proper, and are provided with slots 19 in which the sealing blades 20 are positioned, the sealing blades 20 being formed with curved caps 21 which are of widths equal to the width of the rotor, so that the caps will contact the inner surface of the casing 5 insuring a fluid-tight connection between the rotor and wall of the casing.

Slots 22 are formed along the side edges of sealing blades 20, in which slots 22 are arranged packing strips 23 which contact the inner surfaces of the closure plates 6 insuring a leak-proof connection between the side edges of said packing strips and casing preventing loss of compression. These packing strips are biased outwardly towards the inner surface of the closure plates, by means of the backing springs 24 which are disposed within the slots and contact the rear surfaces of the packing strips, as better shown by FIG. 3 of the drawings.

Positioned within said slots 19 at the bases thereof, are leaf springs 25 which contact the inner ends of the replaceable blades 20, normally biasing the blades 20 outwardly into contact with the casing 5.

Formed in the side surfaces of the rotor 12, are concentric slots 26 in which the curved sealing strips 27 are mounted, the sealing strips 27 being designed to contact the inner surfaces of the closure plates 6, insuring a leak-proof connection between the sides of the rotor and the closure plates or casing of the engine.

As shown by FIG. 4 of the drawings, these sealing strips are held in place within the concentric slots 26, and are biasing outwardly by means of the curved leaf springs 28 which are shown as provided with pins 29 seated in openings formed in the outer surfaces of the rotor. Thus it will be seen that due to this construction, the rotor may operate within the casing and have a complete seal between the rotor and walls of the casing to insure against leakage as the rotor operates within the casing. Then, too, it will be noted that these spring members will compensate for wear on the sealing strips by forcing the sealing strips against the surface of the casing at all times.

An opening is provided in the casing for the reception of the spark plug 30, and while in the present showing the spark plug is illustrated as extending into an opening near the base of the engine, the spark plug may be arranged in any desirable location to meet the requirements of use and facilitate servicing the spark plug.

Supporting legs 31' are provided on the base, and may be bolted to the supporting surface on which the engine is mounted.

As shown by FIGS. 8 and 9 of the drawings, a modified form of connection between the rotor and engine shaft is shown, in which case, the connecting arm which is indicated by the reference character 31 is formed with an elongated opening 32 in which the slidable bearing 33 operates, the slidable bearing 33 having an opening in which the shaft 34 operates, so that as the rotor operates, the rotor may move laterally within the casing, to conform to the shape of the casing to insure the proper operation of the engine.

It will of course be understood that the shaft 34 is keyed to the bearing member 35.

In the operation of the engine, a charge is drawn or forced into the casing through the inlet port 9, and the rotor is rotated mechanically to cause the charge to be compressed as the rotor moves from the inlet opening to a point adjacent to the spark plug. During the rotation of the rotor within the casing, due to the oval form of the casing, the charge which is deposited between the adjacent enlargements 18 of the rotor, will be compressed and when the rotor moves to a position to cause the enlargement at the lead end of the chamber formed between the rotor and the casing, and in which the charge has been compressed, passes the spark plug, the timing of the ignition system will be such that the charge will be fired, and since, because of the shape of the casing, and cylindrical shape of the rotor, a substantially narrow combustion chamber is formed between adjacent enlargements and casing, containing the compressed charge, the charge will be fired and the impact of the fired charge will be directed against the enlargement at the lead end of the chamber in which the charge has been fired, causing a continued rotation of the rotor.

The exhaust gases pass from the casing through the exhaust port 8 after the firing of each charge, clearing the casing for the succeeding charges to be compressed and fired as described.

As the delivery of the fuel to the interior of the casing is continued, it is obvious that the continued firing of the compressed charges within the casing and between the enlargement of the rotor, will cause a continuous rotation of the rotor to operate the shaft 10 in a continuous manner.

It will of course be understood that the conventional charge-forming devices such as carburetor, supercharger or the like may be used for supplying the fuel to the rotor. It will also be understood that the exhaust gases will be treated in the conventional manner.

What is claimed is:

1. In a rotary internal combustion engine, a substantially oval engine casing having a fuel inlet and an exhaust port, a power shaft extending through said casing, a substantially cylindrical rotor mounted within said casing, a bearing secured to said power shaft within said casing, said bearing having an opening, a shaft slidable through said opening of said bearing, pivotally connected with said rotor adapted to transmit movement of said rotor to said power shaft, three equally spaced enlargements on the circumference of said rotor, said enlargements having means defining radial slots in the peripheries thereof, rotor blades mounted in said radial slots, springs mounted in said slots engaging said rotor blades, normally biasing said rotor blades into contact with said oval casing wall, providing a compression chamber, combustion chamber and exhaust chamber between adjacent rotor enlargements with each complete rotation of said rotor, and ignition mechanism for firing a fuel charge in said combustion chamber, rotating said rotor and power shaft.

2. In a rotary internal combustion engine, a substantially oval engine casing having a fuel inlet port and an exhaust port, a power shaft extending through said casing, a rotor mounted within said casing, three equally spaced enlargements disposed on the periphery of said rotor, said enlargements having means defining slots disposed longitudinally thereof, outwardly biased sealing blades mounted in said slots of said rotor, contacting with said casing wall providing a compression chamber, combustion chamber and exhaust chamber with the wall of said casing as said rotor rotates, a bearing secured on said power shaft and extending laterally therefrom, adapted to rotate therewith, a second shaft having one of its ends pivotally connected with said rotor, the other end thereof being slidable through said bearing, springs secured on the latter shaft at opposite sides of said bearing in contact therewith, cushioning the movements of said latter shaft within said bearing, and ignition mechanism for firing the charge contained in said combustion chamber.

3. In a rotary engine, a substantially oval casing having a fuel inlet port and an exhaust port, a power shaft disposed axially of said casing, a floating rotor operating within said casing, a bearing keyed to said power shaft, a shaft mounted for sliding movement through said bearing, having one end thereof pivotally connected to said rotor, coiled springs mounted on said latter shaft contacting opposite sides of said bearing regulating sliding movement of said latter shaft within said bearing, three equally spaced enlargements formed on the periphery of said rotor dividing the space between said rotor and casing into a plurality of combustion chambers, varying in size and shape during rotation of said rotor within said oval casing, said enlargements having slots, sealing blades mounted within said slots, removable sealing caps having rounded outer surfaces, forming a part of said sealing blades, said rounded outer surfaces of said sealing caps contacting the inner surfaces of said rotary casing sealing said rotor against compression loss, means for biasing said sealing blades towards said casing wall, and ignition mechanism for igniting a compressed fuel charge in said combustion chambers.

4. In a rotary internal combustion engine, a substantially oval casing having a fuel inlet port and an exhaust port, a power shaft operating within said casing, a floating substantially cylindrical rotor, mounted within said oval casing, surrounding said shaft, three enlargements providing spaced abutments, arranged on the periphery of said rotor, providing a plurality of fuel chambers between said rotor and casing, a yieldable outwardly biased sealing blade contacting the wall of said casing, forming a part of each enlargement, a second shaft pivotally connected to said rotor, a bearing member secured to said power shaft through which said second shaft reciprocates, the area of said fuel chambers varying, successively forming the chambers into compression chambers, combustion chambers and exhaust chambers, as said rotor rotates within said casing, and ignition mechanism for firing a compressed fuel charge in said compression chamber.

References Cited in the file of this patent

UNITED STATES PATENTS

| 1,577,141 | Morrison et al. | Mar. 16, 1926 |
| 1,812,729 | Teeters | Jan. 30, 1931 |
| 2,061,049 | Spellman | Nov. 17, 1936 |
| 2,866,417 | Nubling | Dec. 30, 1958 |
| 2,880,045 | Wankel | Mar. 31, 1959 |

FOREIGN PATENTS

| 116,414 | Sweden | May 21, 1946 |
| 243,435 | Switzerland | Dec. 16, 1946 |
| 1,125,876 | France | July 16, 1956 |
| 1,211,370 | France | Oct. 12, 1959 |